(12) United States Patent
Murakami et al.

(10) Patent No.: US 8,204,207 B2
(45) Date of Patent: Jun. 19, 2012

(54) COMMUNICATION SUPPORT SYSTEM, COMMUNICATION SUPPORT METHOD AND COMMUNICATION SUPPORT PROGRAM

(75) Inventors: Masahiko Murakami, Kawasaki (JP); Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1590 days.

(21) Appl. No.: 11/606,063

(22) Filed: Nov. 30, 2006

(65) Prior Publication Data

US 2007/0288566 A1  Dec. 13, 2007

(30) Foreign Application Priority Data

Jun. 8, 2006 (JP) .................... 2006-160038

(51) Int. Cl.
*H04M 3/00* (2006.01)
(52) U.S. Cl. .......... 379/266.1; 370/352; 379/88.17; 379/88.18; 379/265.03; 379/266.01; 709/201; 709/228
(58) Field of Classification Search .......... 370/259–271, 370/351–356; 455/412.1–417; 705/50–80, 705/1–9, 12, 21–22, 26, 28–45, 405; 709/201–207, 709/212–237; 379/67.1–88.28, 265.1–266.1
See application file for complete search history.

(56) References Cited

U.S. PATENT DOCUMENTS

| | | | | |
|---|---|---|---|---|
| 5,608,788 A * | 3/1997 | Demlow et al. | .......... | 379/142.07 |
| 6,957,257 B1 * | 10/2005 | Buffalo et al. | ................ | 709/224 |
| 7,187,761 B2 * | 3/2007 | Bookstaff | ................ | 379/201.01 |
| 7,225,139 B1 * | 5/2007 | Tidwell et al. | ............... | 705/7.15 |
| 7,289,605 B1 * | 10/2007 | Jean et al. | .................. | 379/32.01 |
| 7,428,503 B1 * | 9/2008 | Groff et al. | .................. | 705/7.25 |
| 7,474,741 B2 * | 1/2009 | Brunson et al. | ............ | 379/88.17 |
| 7,680,263 B2 * | 3/2010 | Nice et al. | ................ | 379/265.04 |
| 7,734,032 B1 * | 6/2010 | Kiefhaber et al. | ........ | 379/265.01 |
| 7,826,597 B2 * | 11/2010 | Berner et al. | ................ | 379/1.01 |
| 7,929,668 B2 * | 4/2011 | Boetje et al. | ................. | 379/9.03 |
| 2004/0078447 A1 * | 4/2004 | Malik et al. | .................. | 709/206 |
| 2004/0109555 A1 * | 6/2004 | Williams | ................. | 379/265.02 |
| 2005/0002515 A1 * | 1/2005 | Mewhinney et al. | .... | 379/266.08 |
| 2005/0177525 A1 * | 8/2005 | Apple et al. | .................. | 705/400 |
| 2005/0234993 A1 * | 10/2005 | Ordille et al. | .............. | 707/104.1 |

FOREIGN PATENT DOCUMENTS

| | | |
|---|---|---|
| JP | 4-56558 A | 2/1992 |
| JP | 7-303145 A | 11/1995 |
| JP | 2002-44260 A | 2/2002 |
| JP | 2004-312235 A | 11/2004 |
| JP | 2006-99185 A | 4/2006 |

* cited by examiner

*Primary Examiner* — Hemant Patel
(74) *Attorney, Agent, or Firm* — Westerman, Hattori, Daniels & Adrian, LLP

(57) ABSTRACT

A communication support system is connected with a network enabling communication among user terminals and is capable of accessing a user information recording portion in which shared information concerning users and access information showing users who accessed the shared information are recorded. The communication support system includes: a user identification portion that acquires a communication start request from a user terminal and identifies an originator and a receiver; a retrieval portion that retrieves shared information concerning the receiver that the originator has not accessed from data recorded in the user information recording portion; and a control portion that, based on a result of the retrieval by the retrieval portion, controls the communication. Thereby, the communication support system can control whether or not to start the communication based on the presence or not of information about the receiver that the originator should confirm.

11 Claims, 13 Drawing Sheets

71

| Telephone number | Name of sales representative |
|---|---|
| 0001 | Takagi |
| 0002 | Sato |
| 0003 | Arai |
| ... | ... |

72

| Telephone number | Name of customer |
|---|---|
| 1000 | Suzuki |
| 1001 | Katayama |
| ... | ... |

| Name of customer | Shared information | | | Access information | |
|---|---|---|---|---|---|
| | Customer information | Who registered? | Registered date and time | Takagi | Sato |
| Suzuki | PC replace is pending... | Takagi | 2/17 14:00 | Already read | Not read |
| | Toner delivered... | Sato | 2/16 15:00 | Not read | Already read |
| | ... | ... | ... | ... | |

82

| Name of customer | Shared information | | | Access information | |
|---|---|---|---|---|---|
| | Customer information | Who registered? | Registered date and time | Takagi | Arai |
| Katayama | Call was made... | Takagi | 2/18 16:00 | Already read | Not read |
| | Toner delivered ... | Arai | 2/12 15:00 | Not read | Already read |
| | ... | ... | ... | ... | |

FIG.3

| Name of customer | Name of chief sales representative |
|---|---|
| Katayama | Arai |
| Nakazima | Sato |
| ... | ... |

COMMUNICATION SUPPORT SYSTEM, COMMUNICATION SUPPORT METHOD AND COMMUNICATION SUPPORT PROGRAM

BACKGROUND OF THE INVENTION

1. Field of the Invention

The present invention relates to a communication support system, a communication support method and a communication support program that support communication control among a plurality of users.

2. Description of Related Art

Conventionally, a communication system using a telephone has been proposed, whereby when communication is started, information about a user as an originator is obtained from a server installed beforehand based on a telephone number of the originator and the information is displayed to a user as a receiver (see JP H04(1992)-56558 A, for example). As one example, the following case is assumed, in which communication is conducted using the above-stated communication system between a customer of a certain business and a sales representative in charge. For instance, in the case where there are a plurality of sales representatives in charge of one customer, the plurality of sales representatives individually register information concerning the customer in the server. When one of the plurality of sales representatives receives a call from the customer, the communication system acquires, based on the telephone number of the customer, customer's information registered in the server, and displays the acquired customer's information to the sales representative receiving the call. Thereby, the plurality of sales representatives can share the customer information obtained individually.

According to the above-stated conventional communication system, however, there is a problem that an originator who sends a communication start request makes a call without confirming information concerning a receiver that the originator has not confirmed. For example, in the conventional communication system, when a sales representative receives a call from a customer, the sales representative can confirm the customer's information before serving the customer. On the other hand, when a sales representative makes contact with a customer, the sales representative should access the server with customer's information recorded therein to refer to the customer's information before making contact with the customer. However, according to the above-stated communication system, there is a possibility that the sales representative makes contact with the customer without confirming the customer's information. Such a case occurs when the sales representative is on a business trip and therefore it is difficult to access the server, or the sales representative carelessly forgets to refer to the customer's information in the server, for example. For these reasons, the sales representative may fail in good communication with the customer, or insufficient teamwork among the sales representatives may be revealed to the customer, causing degradation of customer satisfaction.

SUMMARY OF THE INVENTION

Therefore, with the foregoing in mind, it is an object of the present invention to provide a communication support system, a communication support method and a communication support program that can control whether or not to start the communication between a receiver and an originator based on the presence or not of information concerning the receiver that the originator should confirm.

A communication support system according to the present invention is connected with a network enabling communication among a plurality of user terminals used by a plurality of users, respectively, and is capable of accessing a user information recording portion in which shared information and access information are recorded, the shared information concerning at least one user included in the plurality of users, to which at least a part of the plurality of users is accessible, and the access information indicating a user who has accessed the shared information. The communication support system includes: a user identification portion that acquires a communication start request from any one of the plurality of user terminals and identifies an originator of a communication that is required to start and a receiver of the communication; a retrieval portion that refers to the shared information and the access information recorded in the user information recording portion and makes a judgment as to whether any piece of the shared information concerning the receiver that the originator has not accessed is present or not; and a control portion that, based on a result of the judgment by the retrieval portion, makes a judgment as to whether the communication between a user terminal of the originator and a user terminal of the receiver is to be started or not and outputs a result of the judgment.

Since the control portion judges as to whether the communication is to be started or not based on the judgment result by the retrieval portion, whether or not to start the communication between the originator and the receiver can be judged based on the presence or not of the shared information concerning the receiver that the originator has not accessed. Furthermore, since the control portion outputs the judgment result, whether or not to start the communication can be controlled based on the output judgment result. As a result, whether or not to start the communication between the receiver and the originator can be controlled based on the presence or not of information about the receiver that the originator should confirm.

In the communication support system according to the present invention, preferably, in the case where the retrieval portion judges that shared information concerning the receiver that the originator has not accessed is present in the user information recording portion, the control portion judges that the communication between the user terminal of the originator and the user terminal of the receiver is not to be started.

With this configuration, in the case where shared information concerning the receiver that the originator has not accessed is present, the communication between the user terminal of the originator and the user terminal of the receiver is inhibited. As a result, the situation where the originator starts the communication with the receiver without confirming the information concerning the receiver that the originator should confirm can be avoided.

In the communication support system according to the present invention, preferably, in the case where the retrieval portion judges that shared information concerning the receiver that the originator has not accessed is present in the user information recording portion, the control portion makes a judgment that the communication between the user terminal of the originator and the user terminal of the receiver is not to be started, and outputs, as a result of the judgment, data indicating a terminal as a forwarding destination that is recorded beforehand.

With this configuration, in the case where shared information concerning the receiver that the originator has not accessed is present, data indicating a forwarding destination terminal is output. Thus, a communication between the user terminal of the originator and the forwarding destination terminal can be started. As a result, the originator can start the communication with the user owing the forwarding destination terminal prior to the communication with the receiver. Thereby, the situation where the originator starts the communication with the receiver without confirming the information concerning the receiver that the originator should confirm can be avoided, and the communication with the predetermined forwarding destination can be started.

Preferably, the communication support system according to the present invention further includes an update portion. In the case where the control portion outputs, as a result of the judgment, data indicating a terminal as a forwarding destination that is recorded beforehand, the update portion updates the access information so as to show that the originator is a user who has accessed the shared information.

With this configuration, in the case where the communication between the user terminal of the user indicated by the forwarding destination data and the user terminal of the originator is started, the access information in the user information recording portion can be automatically updated so as to indicate that the originator has accessed the shared information about the receiver.

Preferably, the communication support system according to the present invention further includes an information providing portion. In the case where the retrieval portion judges that shared information concerning the receiver that the originator has not accessed is present in the user information recording portion, the information providing portion allows the shared information that the originator has not accessed to be sent to the user terminal of the originator.

With this configuration, in the case where shared information concerning the receiver that the originator has not accessed is present, the originator can acquire the shared information.

Preferably, this communication support system according to the present invention further includes an update portion. In the case where the information providing portion makes the shared information that the originator has not accessed sent to the user terminal of the originator, the update portion updates the access information so as to show that the originator is a user who has accessed the shared information.

With this configuration, in the case where the not-accessed shared information about the receiver is sent to the user terminal of the originator, the access information can be automatically updated so as to indicate that the originator has accessed the shared information about the receiver.

In the communication support system according to the present invention, preferably, the user identification portion further acquires a communication completion notice indicating that communication by any one of the plurality of user terminals is completed, and identifies an originator of the completed communication and a receiver of the completed communication and the communication support system further includes a registration portion that registers information containing a history of the completed communication as shared information about at least one of the originator and the receiver in the completed communication.

Since the registration portion registers information concerning the completed communication as shared information about at least one of the originator and the receiver in the completed communication, the information containing the history of the completed communication can be stored as shared information in the user information recording portion. Thereby, without the requirement for a registration operation by a user to register information concerning the completed communication as the shared information, the information concerning the communication can be stored automatically.

The communication support system according to the present invention may be connected with a communication control server that controls a communication among the plurality of user terminals used by the plurality of users, respectively. In such a case, preferably, the communication support system further includes a reception portion that receives from the communication control server a communication start request that is sent from any one of the plurality of user terminals to the communication control server, and notifies the user identification portion of the communication start request, and the control portion outputs the result of the judgment to the communication control server.

With this configuration, the communication control server can control whether or not to start the communication that is required to start by the communication start request received from a user terminal, based on the judgment result output from the control portion. Therefore, the control portion can control whether or not to start the communication between the originator and the receiver through the communication control server.

Preferably, the communication support system according to the present invention further includes a process judgment portion that acquires a communication start request from any one of the plurality of user terminals before the user identification portion acquires the same, makes a judgment as to whether the communication start request contains specific data, and determines based on the judgment as to whether the user identification portion is to be notified of the communication start request.

In the case where the process judgment portion determines that the user identification portion is not to be notified of the communication start request, the user identification portion is not notified of the communication start request. In such a case, the user identification portion, the retrieval portion and the control portion do not perform the process concerning the communication start request. Therefore, the process judgment portion determines whether or not to execute the process concerning the communication start request by the communication support system, based on whether the communication start request includes specific data or not. Thus, the originator can manage whether or not to subject the communication to the process by the communication support system by the presence or not of specific data contained in the corresponding communication start request.

In the communication support system according to the present invention, preferably, in the case where it is judged that shared information concerning the receiver that the originator has not accessed is not present in the user information recording portion, the control portion further judges as to whether the communication start request contains specific data, and in the case where the communication start request contains specific data, the control portion judges that the communication between the user terminal of the originator and the user terminal of the receiver is not to be started.

With this configuration, even when there is no shared information concerning the receiver that the originator has not accessed, if a communication start request includes specific data, the communication between the user terminal of the originator and the user terminal of the receiver is not started. On the other hand, in the case where there is shared information concerning the receiver that the originator has not accessed, a call between a forwarding destination and the originator is started or the shared information is sent to the originator's terminal. Therefore, the originator is allowed to simply confirm the presence or not of the not-accessed shared information concerning the receiver by adding specific data to the communication start request when sending it.

A communication support method according to the present invention uses a computer connected with a network enabling communication among a plurality of user terminals used by a plurality of users, respectively. The communication support method includes the steps of: an identification step in which a user identification portion of the computer acquires a communication start request from any one of the plurality of user terminals and identifies an originator of a communication that is required to start and a receiver of the communication; a retrieval step in which a retrieval portion of the computer accesses a user information recording portion in which shared information and access information are recorded, the shared information concerning at least one user included in the plurality of users, to which at least a part of the plurality of users is accessible, and the access information indicating a user who has accessed the shared information, and the retrieval portion makes a judgment as to whether shared information concerning the receiver that the originator has not accessed is present or not; and a step in which a control portion of the computer makes a judgment, based on a result of the judgment by the retrieval step, as to whether the communication between a user terminal of the originator and a user terminal of the receiver is to be started or not and outputs a result of the judgment.

A communication support program according to the present invention makes a computer connected with a network enabling communication among a plurality of user terminals used by a plurality of users, respectively, execute the following processes of: a process of acquiring a communication start request from any one of the plurality of user terminals and identifying an originator of a communication that is required to start and a receiver of the communication; a retrieval process accessing a user information recording portion in which shared information and access information are recorded, the shared information concerning at least one user included in the plurality of users, to which at least part of the plurality of users is accessible, and the access information indicating a user who has accessed the shared information, and making a judgment as to whether shared information concerning the receiver that the originator has not accessed is present or not; and a process of making a judgment, based on a result of the judgment by the retrieval process, as to whether the communication between a user terminal of the originator and a user terminal of the receiver is to be started or not and outputting a result of the judgment.

According to the present invention, a communication support system, a communication support method and a communication support program can be provided, which can control whether or not to start communication between a receiver and an originator based on the presence or not of information concerning the receiver that the originator should confirm.

These and other advantages of the present invention will become apparent to those skilled in the art upon reading and understanding the following detailed description with reference to the accompanying figures.

BRIEF DESCRIPTION OF THE DRAWINGS

FIG. 2 shows a specific example of data recorded in an identification information recording portion.

FIG. 3 shows a specific example of data recorded in a user information recording portion.

DETAILED DESCRIPTION OF THE INVENTION

Embodiment 1

Figure 1:
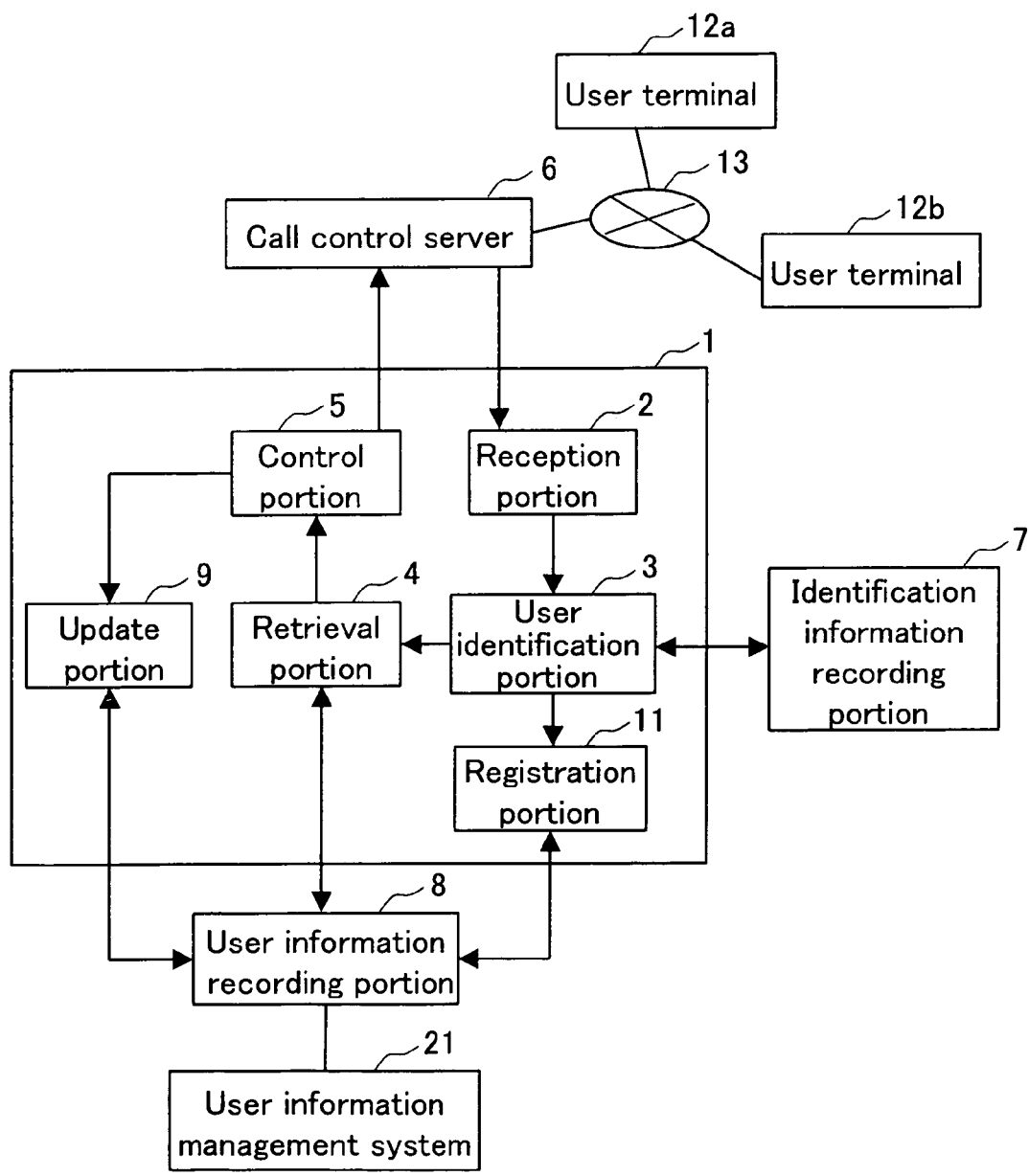
FIG. 1 is a functional block diagram showing the overall configuration of a communication system including a communication support system according to Embodiment 1.

FIG. 1 is a functional block diagram showing the overall configuration of a communication system including a communication support system according to the present embodiment. The communication support system 1 of FIG. 1 is connected with a call control server 6 in a telephone network 13. The telephone network 13 is connected with a plurality of user terminals including user terminals 12a and 12b. The call control server 6 serves as an exchange in the telephone network 13. For instance, in the case where a call from the user terminal 12a is attempted to start with the user terminal 12b, a call start request is sent to the call control server 6. When receiving the call start request, the call control server 6 puts the user terminals 12a and 12b in a communication-ready state. Note here that the call control server 6 is one embodiment of a communication control server according to the present invention.

The call control server 6 further sends the call start request received from the user terminal 12a, 12b to the communication support system 1. For instance, in the case where the user terminal 12a sends a call start request to the call control server 6, the call control server 6 sends the call start request from the user terminal 12a to the communication support system 1. Herein, the call control server 6 does not always have to send the call start request received from a user terminal to the communication support system as it is.

When the call is completed between the user terminals, the call control server 6 sends a call completion notice indicating that the call is completed to the communication support system 1. This call completion notice may be data sent from the user terminals or data generated by the call control server 6.

The communication support system 1 includes a reception portion 2, a user identification portion 3, a retrieval portion 4, a control portion 5, an update portion 9 and a registration portion 11. The communication support system 1 can access an identification information recording portion 7 and a user information recording portion 8.

The communication support system 1 may be implemented by a computer such as a personal computer, a work station or a server. Each of the functions of the reception portion 2, the user identification portion 3, the retrieval portion 4, the control portion 5, the update portion 9 and the registration portion 11 may be implemented by the operation of a CPU of a computer in accordance with predetermined programs. Note here that separate hardware is not necessarily provided corresponding to each of the above-stated functions.

The identification information recording portion 7 and the user information recording portion 8 may be embodied by a memory built in a computer or a memory that such a computer can access. Note here that programs for embodying the functions of the reception portion 2, the user identification portion 3, the retrieval portion 4, the control portion 5, the update portion 9 and the registration portion 11 by a computer or a recording medium with such programs recorded thereon also are one embodiment of the present invention.

The reception portion 2 receives, from the call control server 6, a call start request and a call completion notice, which are sent from any one of the plurality of user terminals connected with the telephone network 13 to the call control server 6, and notifies the user identification portion 3 of them.

The call start request and the call completion notice include a telephone number of an originator's terminal and a telephone number of a receiver's terminal, for example. The originator's terminal means a user terminal from which a call start request is sent. The receiver's terminal means a user terminal for which the starting of a call with the originator's terminal is requested by the call start request.

The user identification portion 3 extracts the telephone number of the originator's terminal and the telephone number of the receiver's terminal of the communication to be started from the call start request or the call completion notice notified by the reception portion 2. The user identification portion 3 refers to the identification information recording portion 7 so as to acquire data indicating the originator and the receiver from the extracted telephone numbers. Thereby, the originator and the receiver can be identified. In the identification information recording portion 7, telephone numbers of user terminals and data indicating users are correlated with each other and recorded.

FIG. 2 shows a specific example of data recorded in the identification information recording portion 7. The present embodiment is described hereinafter concerning the case where a sales representative table 71 and a customer table 72 as shown in FIG. 2 are recorded in the identification information recording portion 7.

In the sales representative table 71, telephone numbers of user terminals and names of sales representatives who are users of the user terminals are correlated with each other and recorded. In the customer table 72, telephone numbers of user terminals and names of customers who are users of the user terminals are correlated with each other and recorded. Herein, the sales representative table 71 and the customer table 72 of FIG. 2 are illustrative only, and data recorded in the identification information recording portion 7 is not limited to this.

The retrieval portion 4 refers to shared information and access information recorded in the user information recording portion 8 so as to judge whether there is shared information concerning the receiver identified by the user identification portion 3 that the originator has not accessed. The retrieval portion 4 uses data representing the originator and the receiver identified by the user identification portion 3 to retrieve the shared information concerning the receiver that the originator has not accessed. Herein, the shared information is information concerning one or more users among users who can access the telephone network 13, which at least a part of the plurality of users can access.

In the user information recording portion 8, the shared information and the access information are recorded for each user, the access information indicating users who have accessed the shared information. Shared information concerning one user contains, for example, information concerning the history of calls made by the user and information concerning the contents of the calls made by the user.

A user information management system 21 receives the input of shared information from users, and registers the input shared information in the user information recording portion 8. That is, a user can register shared information in the user information recording portion 8 through the user information management system 21. Furthermore, the user information management system 21 displays the shared information recorded in the user information recording portion 8 to a user in response to a reading request from the user. That is, a user can access the shared information recorded in the user information recording portion 8 through the user information management system 21.

FIG. 3 shows a specific example of data recorded in the user information recording portion 8. The present embodiment is exemplified hereinafter concerning the case where user information tables 81 and 82 as shown in FIG. 3 are recorded in the user information recording portion 8. In each of the user information tables 81 and 82, a name of a customer, shared information and access information are recorded for each customer. The shared information contains customer information, the name of a person who registered the information and the registered date and time. The data "who registered?" in the table shows a person who registered the shared information and the data "registered date and time" shows the date and time when the shared information was registered. The access information shows whether the corresponding shared information has been accessed or not, which is indicated for each sales representative. "Already read" shows that the information has been already accessed, and "not read" shows that the information has not been accessed.

The access information contains data indicating whether a plurality of sales representatives have accessed the shared information or not. The plurality of sales representatives herein refer to sales representatives who may access the shared information of a certain customer. For instance, in the customer table 81, data indicating that sales representatives named "Takagi" and "Sato" who are in charge of the customer named "Suzuki" have accessed or not the shared information are recorded for each sales representative. A user can set and determine beforehand concerning accessing by which users (sales representatives) to the shared information is to be recorded as the data through the user information management system 21, for example. Alternatively, the user information management system 21 may automatically record as the access information the data of sales representatives who accessed the shared information.

Note here that the data of FIG. 3 is illustrative only, and the data recorded in the user information recording portion 8 is not limited to this. For instance, the access information and the shared information may be recorded in different tables, or may be recorded in a file instead of the table. The data of FIG. 3 contains the shared information and the access information concerning customers of a certain business among users who make a call using the telephone network 13. However, shared information and access information concerning other users may be recorded in the user information recording portion 8.

The control portion 5 judges whether or not to start the communication between a user terminal of the originator and a user terminal of the receiving used based on a result of the judgment by the retrieval portion 4, and outputs a judgment result to the call control server 6. Examples of the judgment result may include data instructing to start a call between the originator's terminal and the receiver's terminal, data instructing to inhibit the starting of a call between the originator's terminal and the receiver's terminal, data indicating a destination to which a call start request sent from the originator's terminal is to be forwarded and the like. The call control server 6 determines whether or not to start the call based on the control data received from the control portion 5.

The update portion 9 updates the data of the user information recording portion 8 in accordance with the process by the control portion 5. When the reception portion 2 receives a call completion notice, the registration portion 11 registers information containing the history of the completed communication in the user information recording portion 8. During this process, the registration portion 11 registers the information containing the history of the completed communication in the user information recording portion 8 as the shared information concerning at least one of the originator and the receiver of the communication. Examples of the information indicating the history of the communication include the date and time of the communication, the talk time, the contents of the talk, the users involved in the call and the like.

Figure 4:
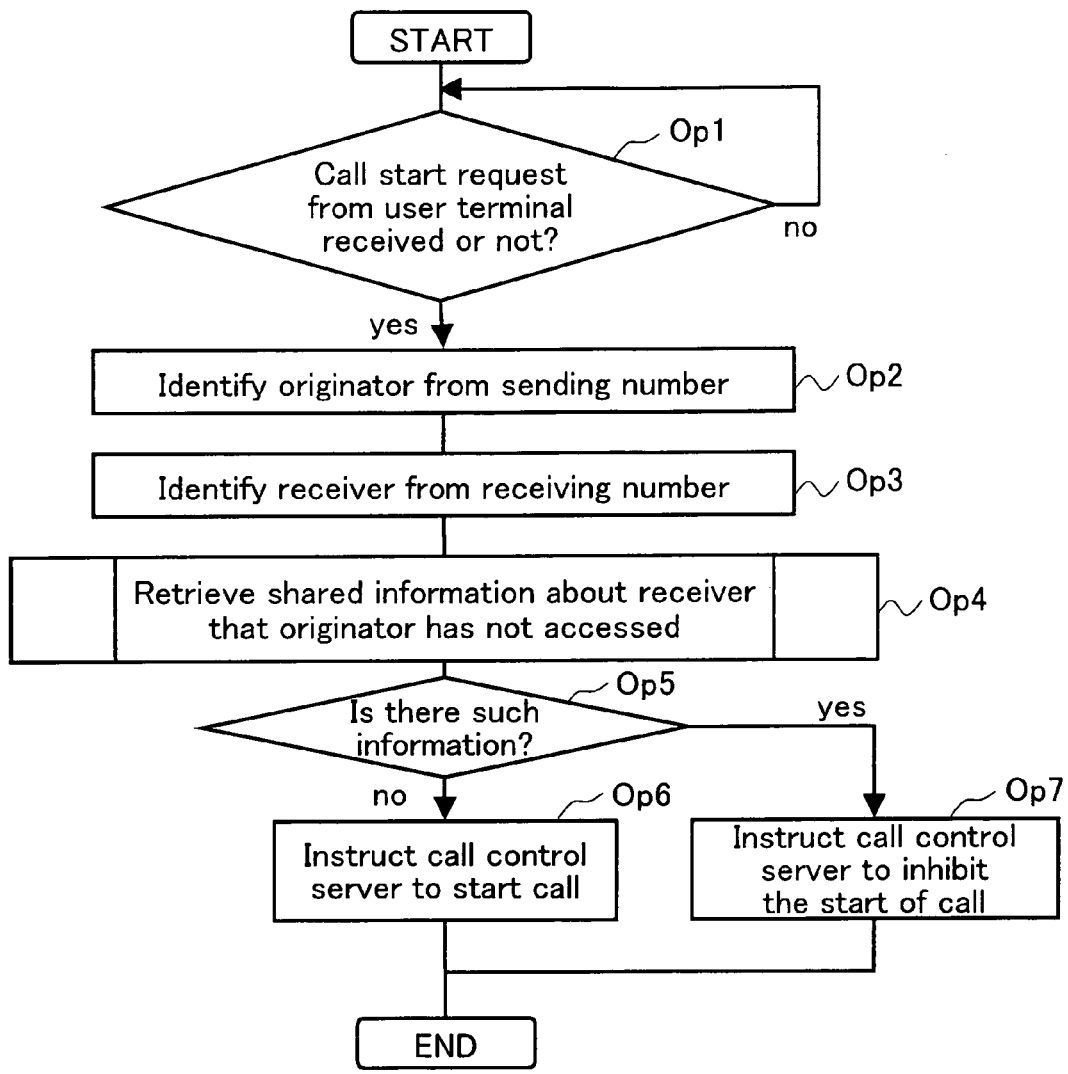
FIG. 4 is a flowchart showing an exemplary operation conducted when the communication support system receives a call start request.

The following describes a specific example of the operation by the communication support system 1. FIG. 4 is a flowchart showing an exemplary operation when the communication support system 1 receives a call start request from the call control server 6.

In the process of FIG. 4, the reception portion 2 judges whether a call start request from a user terminal is received or not through the call control server 6 (Op1). When the reception portion 2 judges that the call start request is received, the reception portion 2 notifies the user identification portion 3 of the received call start request. The reception portion 2 becomes a stand-by state if no call start request is received.

When being notified of the call start request by the reception portion 2, the user identification portion 3 extracts a telephone number of an originator's terminal (hereinafter called sending number) and a telephone number of a receiver's terminal (hereinafter called receiving number) that are included in the call start request. Thereafter, the user identification portion 3 uses the sending number to acquire data indicating an originator from the identification information recording portion 7 (Op2). Furthermore, the user identification portion 3 uses the receiving number to acquire data indicating a receiver from the identification information recording portion 7 (Op3).

Referring to FIG. 2, a specific example of the process at Op2 and Op3 is described below. At Op2, the user identification portion 3 retrieves data in the sales representative table 71 to acquire the name of the sales representative in the record whose telephone number corresponds to the sending number (e.g., assuming "0001"), i.e., "Takagi". In this case, "Takagi" is data indicating the originator. At Op3, the user identification portion 3 retrieves data in the customer table 72 to acquire the name of the customer in the record whose telephone number corresponds to the receiving number (e.g., assuming "1000"), i.e., "Suzuki". In this case, "Suzuki" is data indicating the receiver.

When the data indicating the originator and the data indicating the receiver are acquired at Op2 and Op3, then the retrieval portion 4 uses such data to retrieve shared information concerning the receiver that the originator has not accessed from the user information recording portion 8 (Op4). Then, the retrieval portion 4 judges whether such shared information is present or not (Op5).

For instance, in the case where the data indicating the originator is "Takagi" and the data indicating the receiver is "Suzuki", the retrieval portion 4 refers to the access information in the user information table 81 (see FIG. 3) concerning the customer named "Suzuki". Furthermore, the retrieval portion 4 judges whether the above-stated access information includes or not the data indicating "not read" concerning the sales representative named "Takagi". The access information in the user information table 81 includes the data indicating "not read" concerning the sales representative named "Takagi". In this case, the retrieval portion 4 judges that the shared information about the customer named "Suzuki" includes the shared information that the sales representative named "Takagi" has not accessed.

As a result of the retrieval at Op4, if the retrieval portion 4 judges that the shared information concerning the receiver that the originator has not accessed is present (yes at Op5), the control portion 5 generates control data instructing to inhibit the starting of a call between the originator's terminal and the receiver's terminal, and sends it to the call control server 6 (Op7). When receiving such control data from the control portion 5, the call control server 6 responds to the originator's terminal, indicating that the call cannot be started. As a result, the call between the originator's terminal and the receiver's terminal is not started.

On the other hand, as a result of the retrieval at Op4, if the retrieval portion 4 judges that shared information of the above-stated nature is not present (no at Op5), the control portion 5 generates control data instructing to start a call between the originator's terminal and the receiver's terminal, and sends it to the call control server 6 (Op6). When receiving such control data from the control portion 5, the call control server 6 forwards the call start request from the originator's terminal to the receiver's terminal. When the call control server 6 receives a response from the receiver's terminal indicating that it is ready to the call, the call control server 6 puts the originator's terminal and the receiver's terminal in a communication-ready state.

According to the above-stated process of FIG. 4, the communication support system 1 can control a call not to be started between the originator and the receiver if the shared information concerning the receiver that the originator has not accessed is present.

Figure 5:
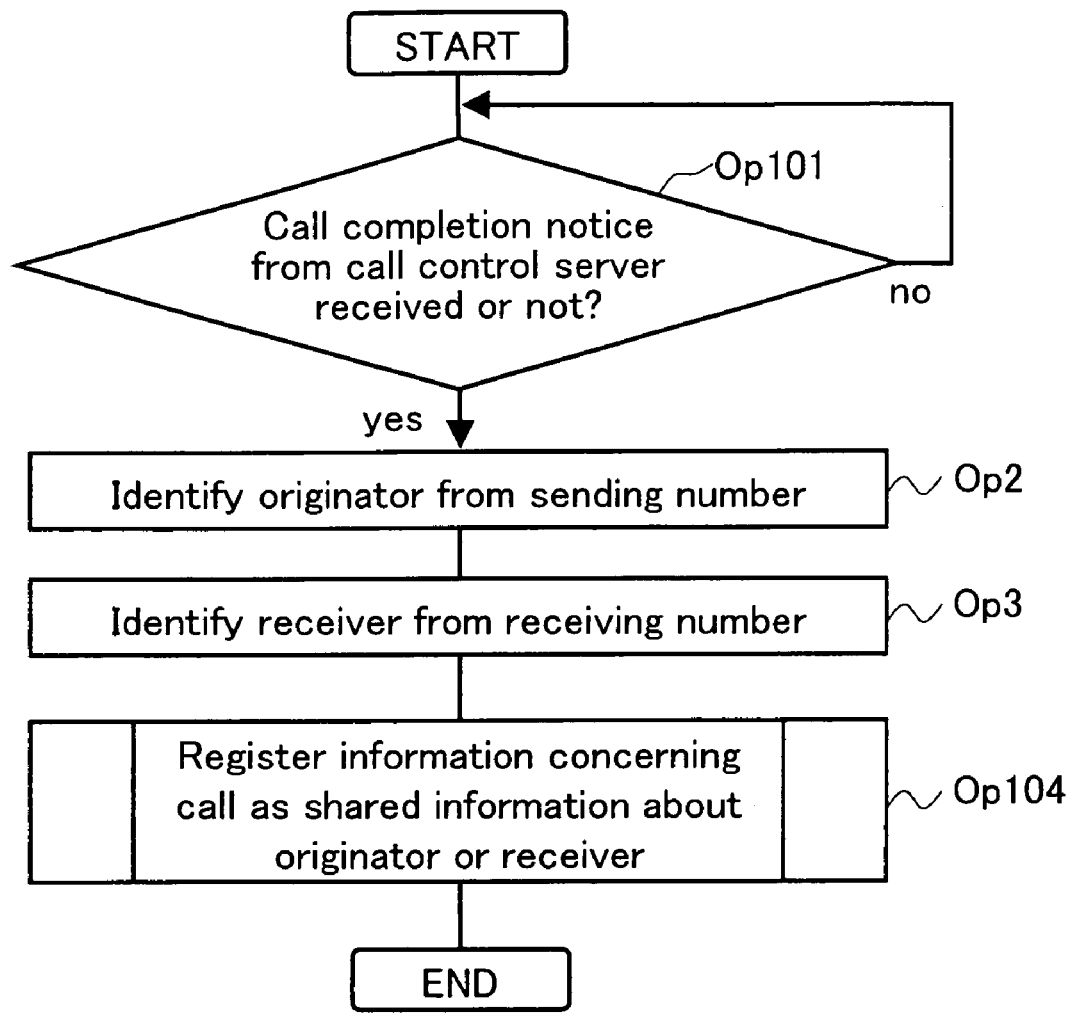
FIG. 5 is a flowchart showing an exemplary operation conducted when the communication support system receives a call completion notice.

Referring now to FIG. 5, an exemplary operation conducted when the communication support system 1 receives a call completion notice from the call control server 6 is described below. In the process of FIG. 5, the reception portion 2 judges whether a call completion notice is received or not from the call control server 6 (Op101). When it is judged that the call completion notice is received from the call control server 6, the reception portion 2 passes the received call completion notice to the user identification portion 3.

When receiving the call completion notice passed from the reception portion 2, the user identification portion 3 extracts a sending number and a receiving number included in the call completion notice. The following process at Op2 and Op3 is the same as that at Op2 and Op3 of FIG. 4.

Following Op3, the registration portion 11 registers in the user information recording portion 8 information including the history of the thus completed communication as the shared information about at least one of the originator and the receiver (Op104).

Herein, a specific example of the registered information including the history of the complete communication is described below. The customer information, "call was made" is an exemplary customer information that is registered as the information indicating the history of a call where the originator is the sales representative named "Takagi" and the receiver is the customer named "Katayama". The registered information indicating the history of the call further includes "Takagi" as the name of the person who registered the shared information and "2/18 16:00" as the registered date and time of the shared information. In addition, "already read" is registered as the access information about "Takagi" and "not read" is registered as the access information about "Arai". Note here that FIG. 3 shows the exemplary data in the user information recording portion 8 where the shared information and the access information are recorded for the customers only and not for the sales representatives and other users. Therefore, the registration portion 11 may register the shared information and the access information only about "Katayama" as a customer, and not about "Takagi".

As stated above, according to the process of FIG. 5, in the case where the reception portion 2 receives a call completion notice, information concerning the history of the completed call is stored in the user information recording portion 8. Thereby, the information concerning the history of the completed communication can be stored automatically in the user information recording portion 8 without the requirement for a registration operation by a user. This can avoid the situation where after a sales representative completes a call with a customer, the sales representative forgets to register such a call in the user information recording portion 8, and therefore another sales representative makes a call again to the customer concerning the same business.

Figure 6:
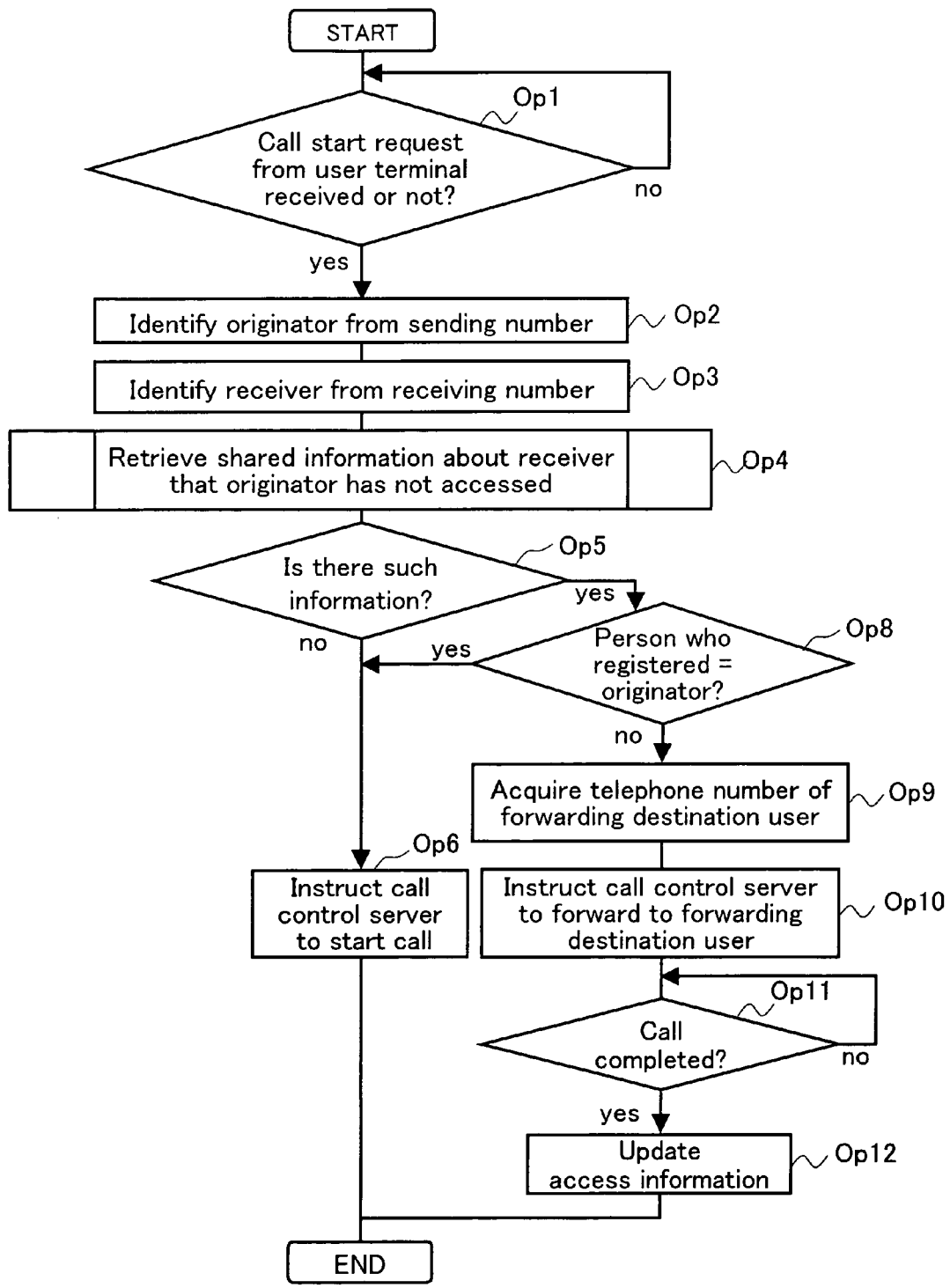
FIG. 6 is a flowchart showing a modified example of the operation conducted when the communication support system receives a call start request.

The following describes a modified example of the operation by the communication support system 1. FIG. 6 is a flowchart showing a modified example of the operation conducted when the communication support system 1 receives a call start request from the call control server 6.

In the process of FIG. 6, Op1 to Op6 are the same as Op1 to Op6 of FIG. 4. In the case of yes at Op5, the retrieval portion 4 acquires from the user information recording portion 8 the information indicating a person who registered the shared information that was found as a result of the retrieval, and judges whether the person who registered is the originator or not (Op8). If the person who registered is the originator (yes at Op8), the control portion 5 sends control data instructing to start a call to the call control server 6 (Op6).

If the person who registered is different from the originator (no at Op8), the control portion 5 acquires from the identification information recording portion 7 a telephone number of a user terminal of the person who registered as a telephone number of a user terminal as a forwarding destination (Op9). For instance, in the case where the originator is the sales representative named "Takagi" and the receiver is the customer named "Katayama", the person who registered the shared information that "Takagi" has "not read" is "Arai" as shown in the user information table 82 of FIG. 3. In this case, the control portion 5 acquires the telephone number "0003" of the user terminal of the person who registered, i.e., "Arai" from the sales representative table 71 of FIG. 2.

At this time, in the case where there are a plurality of pieces of shared information that the originator has not accessed, the control portion 5 acquires a telephone number of the person who registered shared information most recently among the plurality of pieces of shared information. Thereby, the person having the newest information can be a user as a forwarding destination.

Then, the control portion 5 generates control data instructing the call start request from the receiver's terminal to be forwarded to the user terminal as the forwarding destination user, and sends it to the call control server 6 (Op10). This control data instructing the forwarding includes the telephone number of the user terminal as the forwarding destination (i.e., the telephone number "0003" of the user terminal of the person who registered, i.e., "Arai" that is acquired at Op9).

When receiving this control data, the call control server 6 forwards the call start request from the receiver's terminal to the user terminal of the forwarding destination user. As a result, a call is started between the user terminal of the person who registered, i.e., "Arai" that is indicated by the telephone number of the forwarding destination user terminal and the user terminal of "Takagi" as the originator. When this call is completed, the call control server 6 sends a call completion notice to the reception portion 2.

Following Op10, the control portion 5 judges whether the call between the originator's terminal and the forwarding destination user's terminal is completed or not (Op11). At Op11, the control portion 5 can make such a judgment based on whether the reception portion 2 receives or not a call completion notice from the call control server 6.

When the control portion 5 judges that the call is completed, the update portion 9 updates the access information in the user information recording portion 8 so that the originator is included in the users who have already accessed the shared information concerning the receiver (Op12). The update portion 9 updates the access information in the user information table 82 of FIG. 3, for example, so as to update "not read", showing that "Takagi" has not accessed, into "already read" showing having accessed (Op12).

As stated above, according to the process of FIG. 6, if there is shared information concerning the receiver that the originator has not accessed, the communication support system 1 controls so that the originator does not start a call with the receiver, but starts a call with the person who registered the shared information. Thereby, the originator can talk with the person who registered the shared information that the originator has not accessed. As a result, the originator further can obtain information that has not been recorded in the user information recording portion 8 from the person who registered the shared information. Furthermore, when the call between the originator and the person who registered the shared information is completed, the access information can be updated automatically as having accessed.

Figures 7, 8:
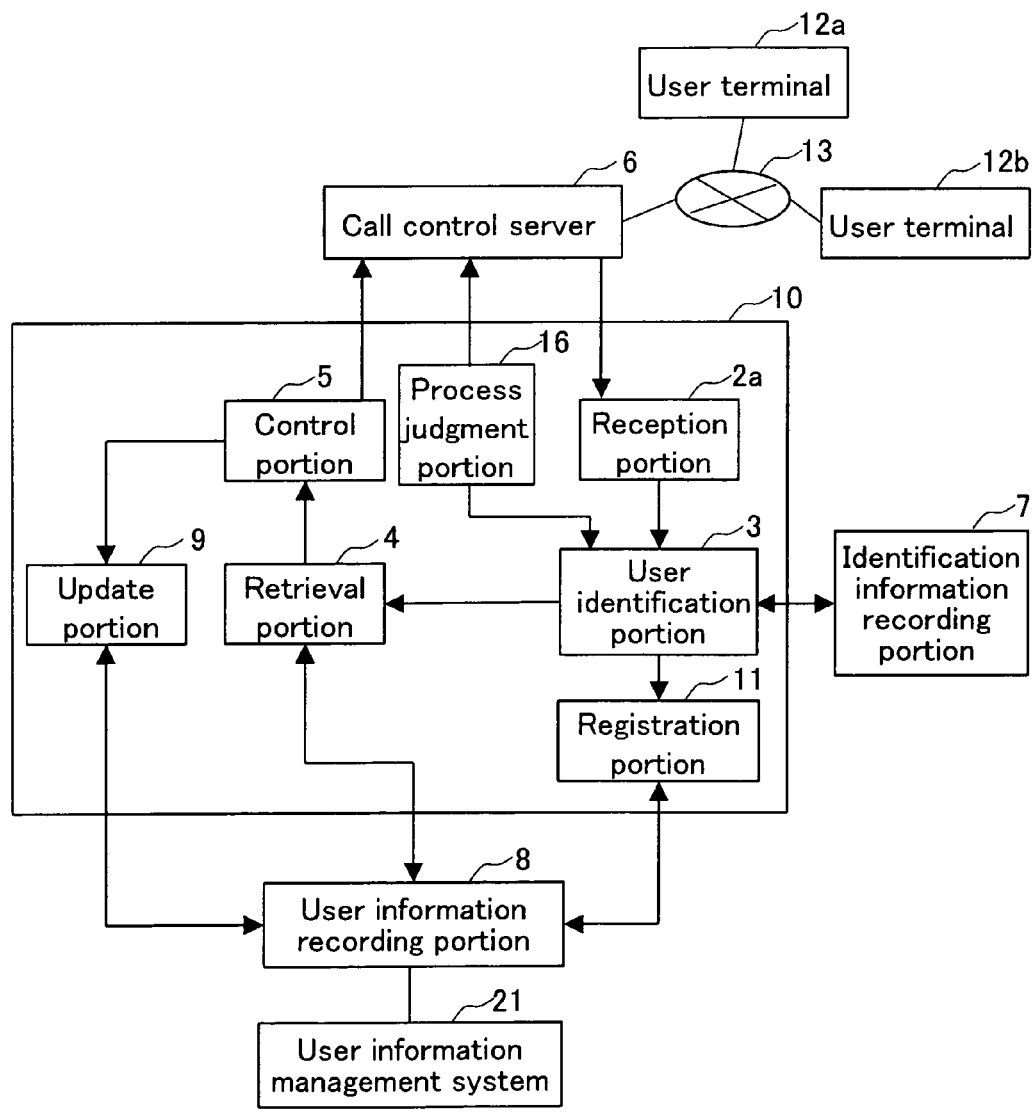
FIG. 7 shows a specific example of data indicating a forwarding destination that has been recorded beforehand.
FIG. 8 is a functional block diagram showing the overall configuration of a communication system including a communication support system according to Embodiment 2.

Note here that although a person who registered that is listed in the shared information is selected as the forwarding destination in the example of FIG. 6, the forwarding destination is not limited to the person who registered. For instance, the control portion 5 may determine the forwarding destination using data indicating a forwarding destination that has been recorded beforehand separately from the shared information. FIG. 7 shows a specific example of the data showing a forwarding destination that is recorded beforehand. In the data of FIG. 7, names of customers and names of chief sales representative therefor are correlated with each other and recorded. For instance, in the case where the receiver is a customer named "Katayama", the control portion 5 may refer to the data of FIG. 7 to obtain the name "Arai" of the chief sales representative as the data indicating the forwarding destination user, instead of the process of Op9. As shown in FIG. 7, data indicating a forwarding destination may be recorded beforehand for each receiver, whereby a user having detailed information about a receiver can be set for the forwarding destination.

That is the explanation of Embodiment 1, but a communication system to which the communication support system 1 is applicable is not limited to the above-stated communication system using the telephone network 13. For instance, the communication support system 1 of the present invention is applicable to a mail communication system over the Internet or an intranet, an instant messaging (IM) system or the like as well.

Embodiment 2

FIG. 8 is a functional block diagram showing the overall configuration of a communication system including a communication support system according to the present embodiment. In FIG. 8, the same reference numerals are assigned to the same elements as those of FIG. 1 and their explanations are not repeated. A communication support system 10 of FIG. 8 has the configuration including a process judgment portion 16 in addition to the communication support system 1 of FIG. 1.

The process judgment portion 16 judges whether a call start request received by a reception portion 2a from a user terminal through a call control server 6 includes a specific number or not. Then, based on a result of the judgment, the process judgment portion 16 either notifies a user identification portion 3 of the call start request or instructs the call control server 6 to continue a call start process without notifying of the call start request.

Herein, the specific number is added when a user terminal sends a call start request. When a user performs an operation of sending a call start request from a user terminal, a telephone number of a user terminal of a person with whom the user wishes to talk may be input. At the time of inputting, the user may input the specific number in addition to the above-stated telephone number.

Figures 9, 10:
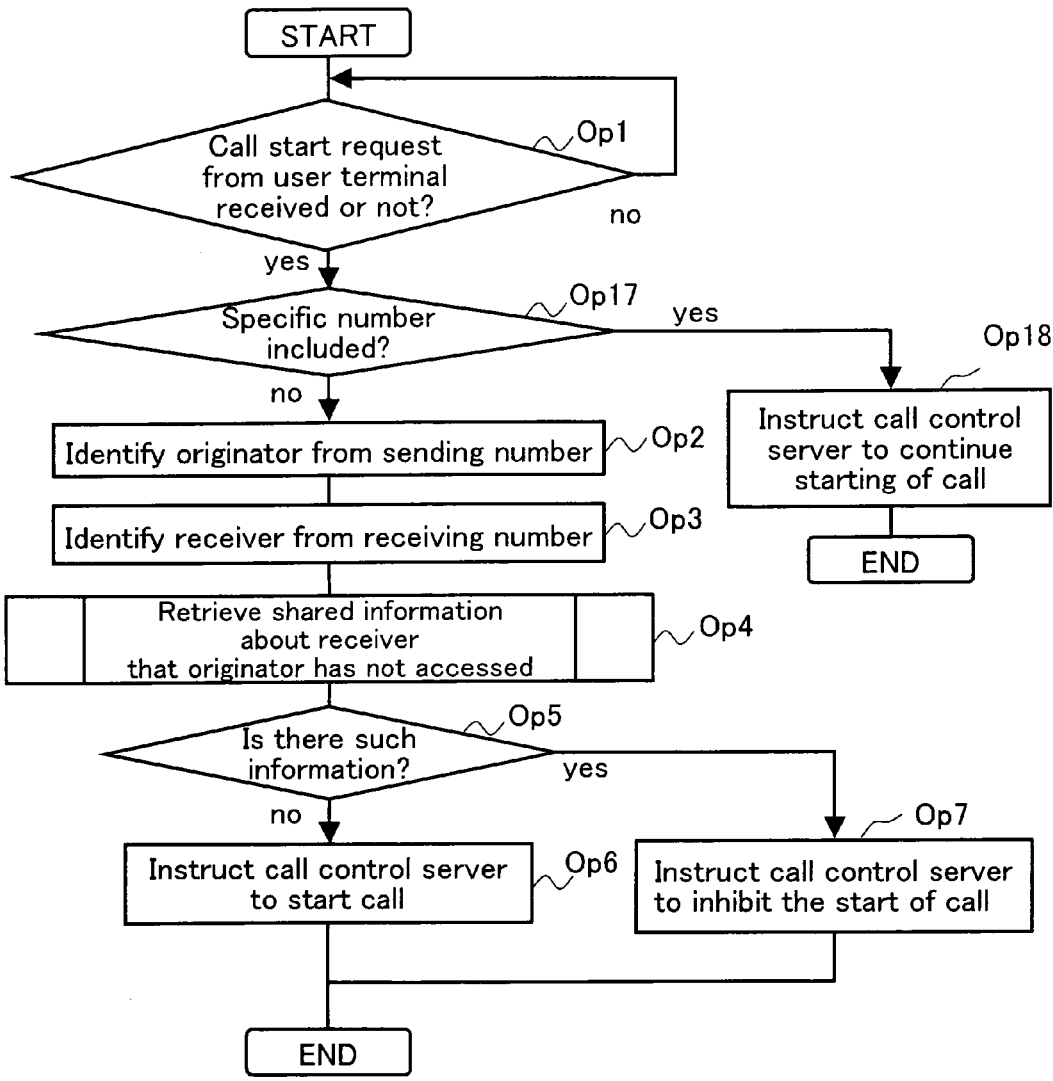
FIG. 9 is a flowchart showing an exemplary operation conducted when the communication support system receives a call start request.
FIG. 10 shows a specific example of recorded data concerning a number set for each user.

The following describes a specific example of the operation by the communication support system 10. FIG. 9 is a flowchart showing an exemplary operation when the communication support system 10 receives a call start request from the call control server 6. In FIG. 9, Op1 to Op7 are the same process as that at Op1 to Op7 of FIG. 4.

When judging that a call start request from a user terminal is received through the call control server 6 at Op1, the reception portion 2a notifies the process judgment portion 16 of the received call start request. The process judgment portion 16 judges whether the call start request includes a specific number or not (Op17). Herein, the specific number is a predetermined number showing that the communication is not subjected to the control by the communication support system 10.

If the process judgment portion 16 judges that the call start request includes the specific number (yes at Op17), the process judgment portion 16 sends data to the call control server 6 to instruct to continue the process of starting a call corresponding to the call start request (Op18). When receiving this data, the call control server 6 continues the operation of starting the call. Note here that the user identification portion 3 is not notified of the call start request received by the reception portion 2a.

On the other hand, if the process judgment portion 16 judges that the call start request does not include the specific number (no at Op17), the process judgment portion 16 notifies the user identification portion 3 of the call start request. The following process at Op2 to Op7 is the same as that at Op2 to Op7 of FIG. 4.

As stated above, according to the process of FIG. 9, if a call start request includes a specific number, the communication corresponding to the call start request is allowed not to be subjected to the control by the communication support system 10. Thus, when an originator sends a call request start, the originator may input a predetermined specific number in addition to a telephone number of a person with whom the user wishes to talk, thus allowing the corresponding call not to be subjected to the call control by the communication support system 10.

In the present embodiment, in the case where a call start request includes a specific number, the process judgment portion 16 makes the communication support system 10 not perform the communication control. Conversely, in the case where a call start request does not include a specific number, the communication control by the communication support system 10 may be omitted.

The process judgment portion 16 may be provided in the call control server 6. In such a case, depending on a call start request acquired from a user terminal including a specific number or not, the process judgment portion 16 determines whether or not to send the call start request to the reception portion 2a. Then, in the case where the process judgment portion 16 determines the call start request to be sent, the process judgment portion 16 sends the call start request to the reception portion 2a. That is to say, the process judgment portion 16 sends only a call start request that is required to be processed by the communication support system 10 to the reception portion 2a.

In the case where the communication support system 10 is applied not to the communication system using the telephone network 13 including the above-stated call control server 6, but to a mail communication system over the Internet or an intranet, an IM system or the like, a specific keyword can be used instead of the above-stated specific number. That is, the above-stated specific number is one example of specific data indicating that a specific process is to be performed.

Furthermore, the above-stated specific number may be different for each user. In this case, such a specific number set for each user can be recorded in the identification information recording portion 7, for example. The process judgment portion 16 may identify a receiver based on a receiving number included in a call start request, and acquire a specific number set for the receiver from the identification information recording portion 7. The process judgment portion 16 judges whether the acquired specific number is included in the call start request or not.

FIG. 10 shows a specific example of the recorded data concerning a specific number set for each user. A customer table 72a of FIG. 10 has the configuration including specific numbers set for the respective users (customers) in addition to the customer table 72 of FIG. 2. For instance, in the case where a receiver indicated by the receiving number included in a call start request is the customer named "Suzuki", the process judgment portion 16 acquires the number "#1111" specific to "Suzuki" for the call start request at the above-stated Op17. Then, the process judgment portion 16 judges whether the acquired specific number "#1111" is included in the call start request or not.

Embodiment 3

Figure 11:
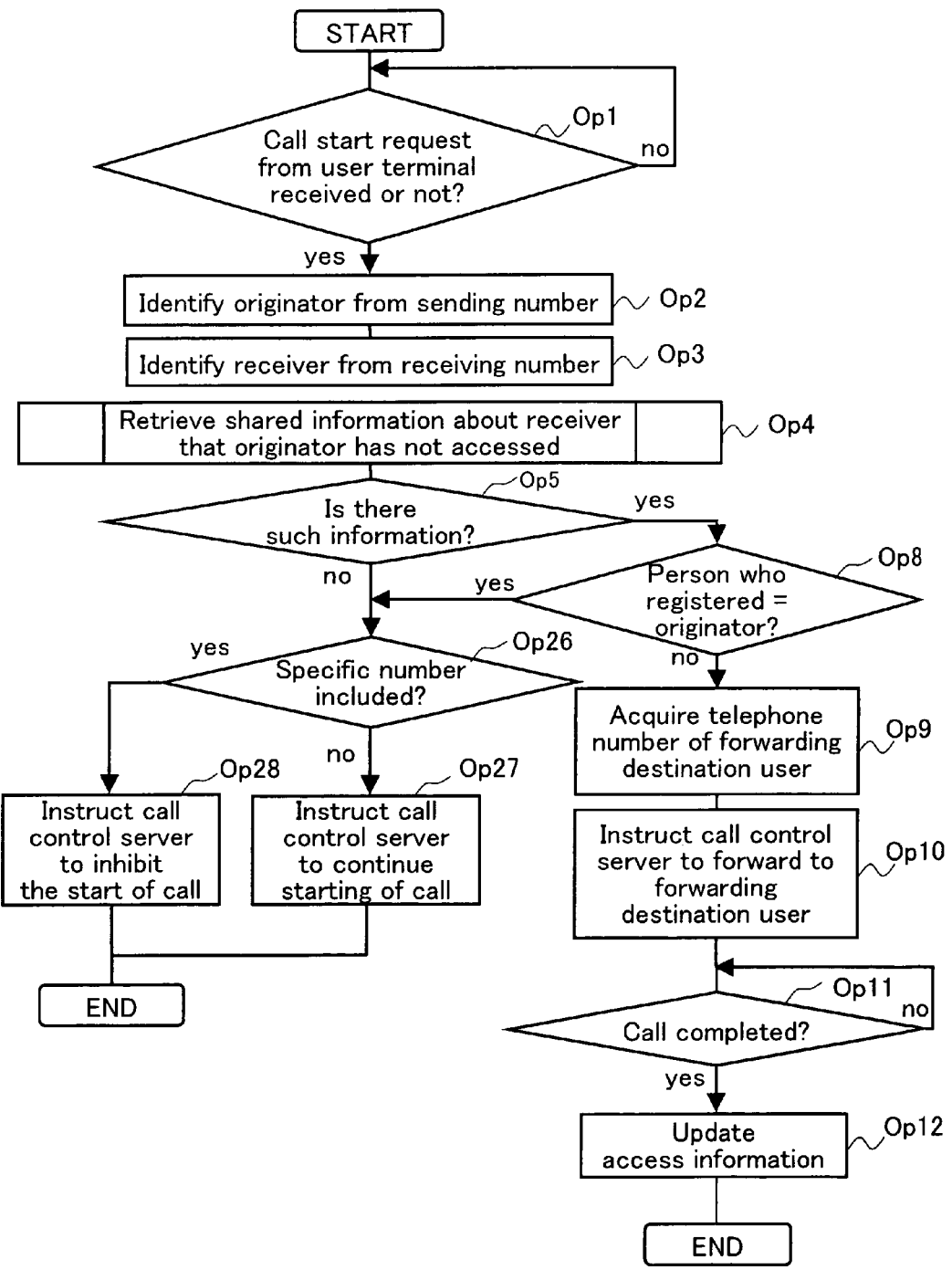
FIG. 11 is a flowchart showing the operation by a communication support system according to Embodiment 3.

FIG. 11 is a flowchart showing the operation by a communication support system according to the present embodiment. In FIG. 11, Op1 to Op5 and Op8 to Op12 are the same process as those of Op1 to Op5 and Op8 to Op12, respectively of FIG. 6. The communication support system according to the present embodiment can be configured in a similar manner to the communication support system 1 of FIG. 1.

In FIG. 11, in the case of no at Op5, i.e., in the case where a retrieval portion 4 judges that shared information about a receiver that an originator has not accessed is not present, a control portion 5 judges whether a call start request includes a specific number or not (Op26). In the case of yes at Op8 as well, the process at Op26 is performed. Herein, the specific number is a number indicating that the starting of the communication is to be inhibited.

If the control portion 5 judges that the specific number is not included (no at Op26), the control portion 5 generates control data instructing to continue a process of starting the communication corresponding to the call start request, and sends it to a call control server 6 (Op27).

If the control portion 5 judges that the specific number is included (yes at Op26), the control portion 5 generates control data instructing to inhibit the starting of the communication corresponding to the call start request, and sends it to the call control server 6 (Op28).

As stated above, according to the process of FIG. 11, even when there is no shared information concerning a receiver that an originator has not accessed, if a call start request includes a specific number, a call with the receiver can be inhibited. On the other hand, in the case where there is shared information concerning a receiver that an originator has not accessed, a call is started between the originator and a person who registered the shared information. That is to say, when an originator sends a call start request to which a specific number is added, if there is shared information not accessed, the call start request is forwarded to the person who registered, and if there is no shared information not accessed, the starting of a call is inhibited. That is, the originator is allowed to simply confirm the presence or not of the not-accessed shared information.

Note here that in the present embodiment whether or not to inhibit the starting of a call is determined depending on whether a specific number is included or not. However, the control by the control portion 5 based on a specific number is not limited to this example. For instance, whether or not to perform forwarding to a person who registered can be determined depending on whether a specific number is included or not.

Furthermore, when the present embodiment is applied to a mail communication system, an IM system or the like, a specific keyword can be used instead of the above-stated specific number.

Embodiment 4

Figure 12:
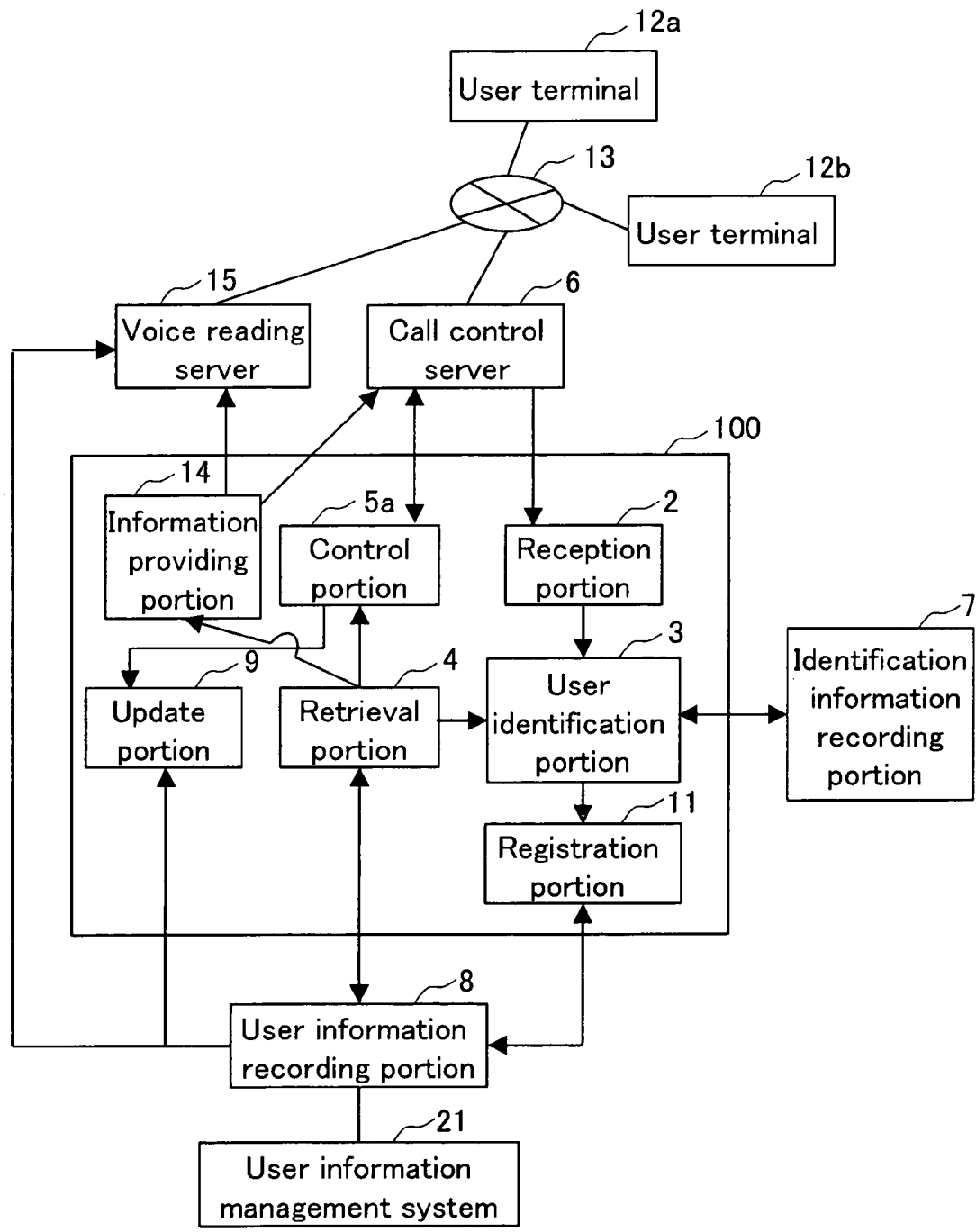
FIG. 12 is a functional block diagram showing the overall configuration of a communication system including a communication support system according to Embodiment 4.

FIG. 12 is a functional block diagram showing the overall configuration of a communication system including a communication support system according to the present embodiment. In a communication support system 100 of FIG. 12, the same reference numerals are assigned to the same elements as those of FIG. 1 and their explanations are not repeated.

The communication support system 100 of FIG. 12 further includes an information providing portion 14. Furthermore, the communication support system 100 is connected with a call control server 6 and a voice reading server 15 in a telephone network 13. The voice reading server 15 has functions of reproducing voice data and conveying the reproduced voice to user terminals 12a and 12b via the telephone network 13.

The present embodiment is described below assuming that shared information recorded in a user information recording portion 8 contains voice data. As the shared information, data of the past telephone conversations is recorded in the form of voice data. The shared information containing the voice data is recorded in the user information recording portion 8 by a registration portion 11 or by a user information management system 21 like the above-stated Embodiment 1.

In the case where a retrieval portion 4 judges that shared information that an originator has not accessed is present in the user information recording portion 8, the information providing portion 14 instructs the call control server 6 to send the shared information to a terminal of the originator.

More specifically, in the case where the retrieval portion 4 judges that shared information that an originator has not accessed is present, the information providing portion 14 instructs the call control server 6 to forward a call start request sent by the originator's terminal to the voice reading server 15. Furthermore, the information providing portion 14 instructs the voice reading server 15 about the voice data that is to be read aloud for the originator. When receiving the call start request from the call control server 6, the voice reading server 15 starts a call with the originator, and reproduces the voice data instructed by the information providing portion 14 during the started call. Thereby, the voice reading server 15 can convey the reproduced voice to the originator's terminal.

Figure 13:
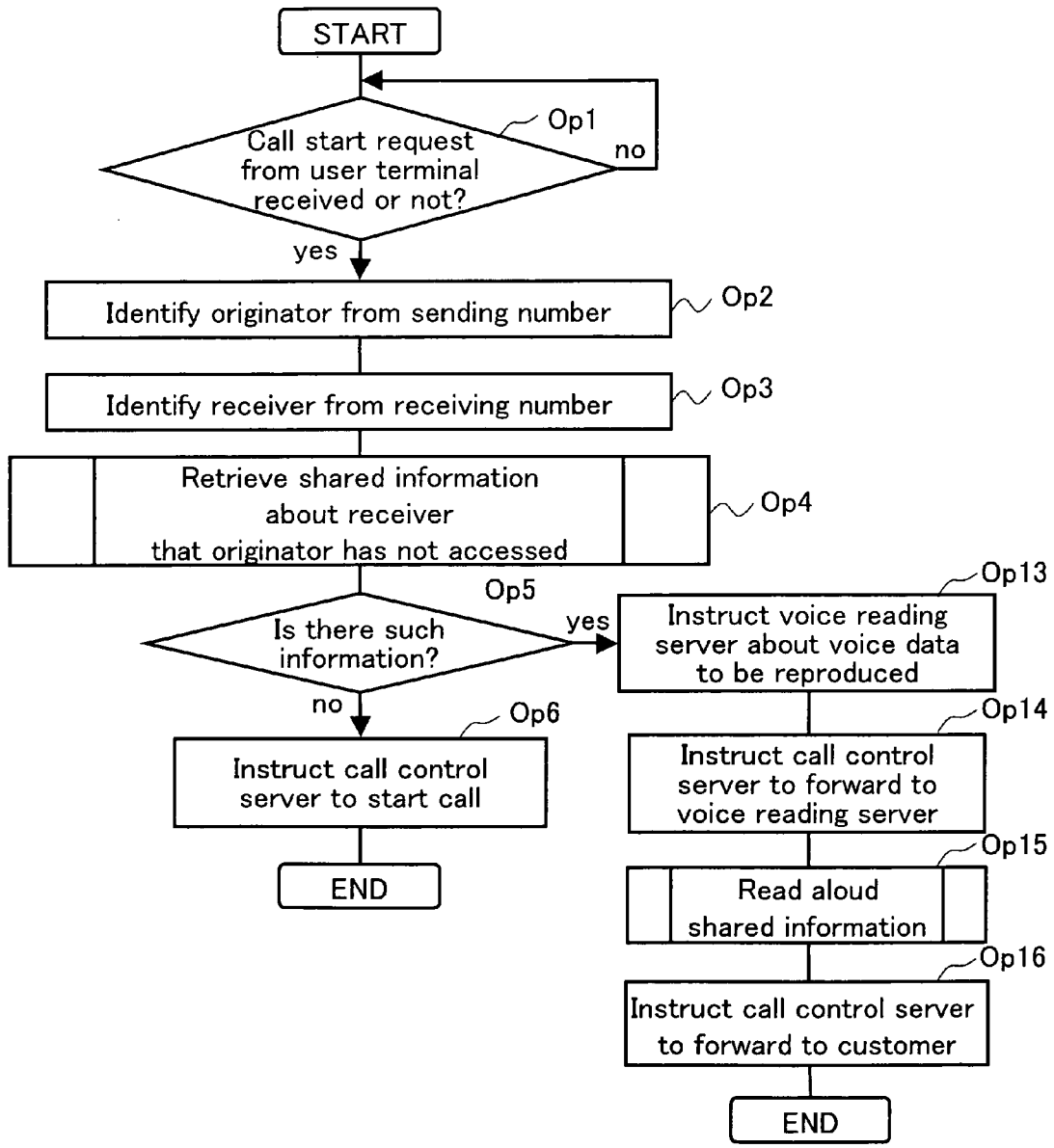
FIG. 13 is a flowchart showing an exemplary operation conducted when the communication support system receives a call start request.

The following describes a specific example of the operation by the communication support system 100. FIG. 13 is a flowchart showing an exemplary operation when the communication support system 100 receives a call start request from the call control server 6. In the process of FIG. 13, Op1 to Op6 are the same as Op1 to Op6 of FIG. 4.

In FIG. 13, in the case of yes at Op5, that is, in the case where the retrieval portion 4 judges that shared information concerning a receiver that the originator has not accessed is present, the information providing portion 14 instructs the voice reading server 15 about the voice data that is to be read aloud for the originator (Op13). At this time, the information providing portion 14 instructs the voice reading server 15 to read aloud the voice data contained in the shared information that was found as a result of the retrieval at Op4.

The information providing portion 14 further generates control data instructing to forward the call start request sent by the originator's terminal to the voice reading server 15, and sends it to the call control server 6 (Op14). That is, the information providing portion 14 sends control data instructing to start a call between the voice reading server 15 and the originator to the call control server 6. This control data contains a telephone number of the voice reading server 15, for example.

When receiving the control data from the information providing portion 14, the call control server 6 forwards the call start request to the voice reading server 15. When receiving the call start request from the call control server 6, the voice reading server 15 starts a call with the originator. During the call, the voice reading server 15 reproduces the voice data instructed by the information providing portion 14 at Op13. In this way, the shared information is read aloud (Op15).

When the reproduction is completed, the voice reading server 15 completes the call with the originator's terminal, and notifies the call control server 6 of the completion of the reproduction. When receiving the notice, the call control server 6 notifies a control portion 5a also of the completion of the reproduction. When receiving the notice, the control portion 5a generates control data instructing to start a call between the originator and the receiver, and sends it to the call control server 6 (Op16).

In this way, even when shared information that the originator has not accessed is present, the control portion 5a may instruct to start a call on the condition that the not-accessed shared information is sent to the originator.

As stated above, according to the process of FIG. 13, in the case where shared information concerning a receiver that an originator sending a call start request has not accessed is present, the originator can acquire the read-aloud shared information before starting a call with the receiver.

The above-described embodiment concerns the case where the shared information contains voice data. In the case where the shared information contains text data and not voice data, the voice reading server 15 may convert the text data into voice data and reproduce the converted voice data, for example.

The above-described embodiment concerns the case where the shared information is sent to the originator by reading out the shared information by the voice reading server 15. However, the method of sending the shared information to an originator is not limited to the above-stated voice reading. For instance, the shared information can be sent to an originator by mail or IM using a mail server or an IM server, instead of the voice reading server 15.

Embodiment 5

Figure 14:
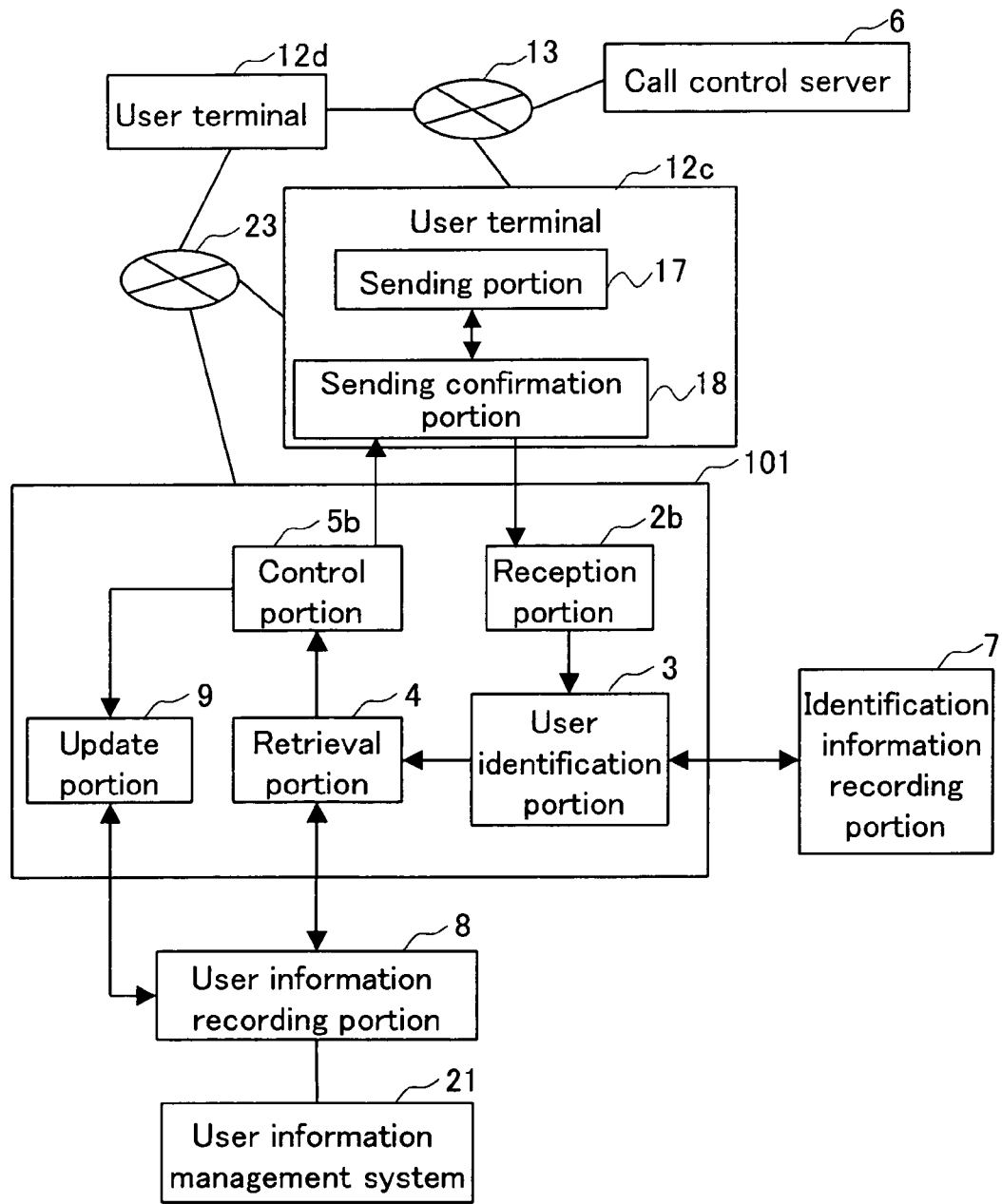
FIG. 14 is a functional block diagram showing the overall configuration of a communication system including a communication support system according to Embodiment 5.

FIG. 14 is a functional block diagram showing the overall configuration of a communication system including a communication support system according to the present embodiment. In a communication support system 101 of FIG. 14, the same reference numerals are assigned to the same elements as those of FIG. 1, and their explanations are not repeated.

The communication support system 101 of FIG. 14 is connected with a packet communication network 23. User terminals 12c and 12d are connected with the packet communication network 23. Therefore, the user terminals 12c and 12d can access the communication support system 101 via the packet communication network 23.

In the present embodiment, the user terminal 12c is provided with a sending portion 17 and a sending confirmation portion 18. Since the user terminal 12d has a configuration similar to that of the user terminal 12c, the following describes the user terminals 12c only. When a user performs a sending operation to the user terminal 12c, the sending portion 17 generates a call start request that is sent to a call control server 6.

Before sending the generated call start request to the call control server 6, the sending portion 17 notifies the sending confirmation portion 18 about that. When receiving the notice about the call start request, the sending confirmation portion 18 judges whether or not to send the call start request. More specifically, the sending confirmation portion 18 sends the call start request to the communication support system 101, and receives control data as a response thereto. Based on the received control data, the sending confirmation portion 18 judges whether or not to send.

A reception portion 2b of the communication support system 101 receives a call start request from any one of a plurality of user terminals (herein exemplifying the user terminal 12c) connected with the packet communication network 23, and notifies a user identification portion 3 of it. The functions of the user identification portion 3, a retrieval portion 4 and an update portion 9 are the same as those described in Embodiment 1. A control portion 5b, based on the judgment result of the retrieval portion 4, generates control data for the control of sending from the user terminal 12c and sends it to the user terminal 12c.

Figure 15:
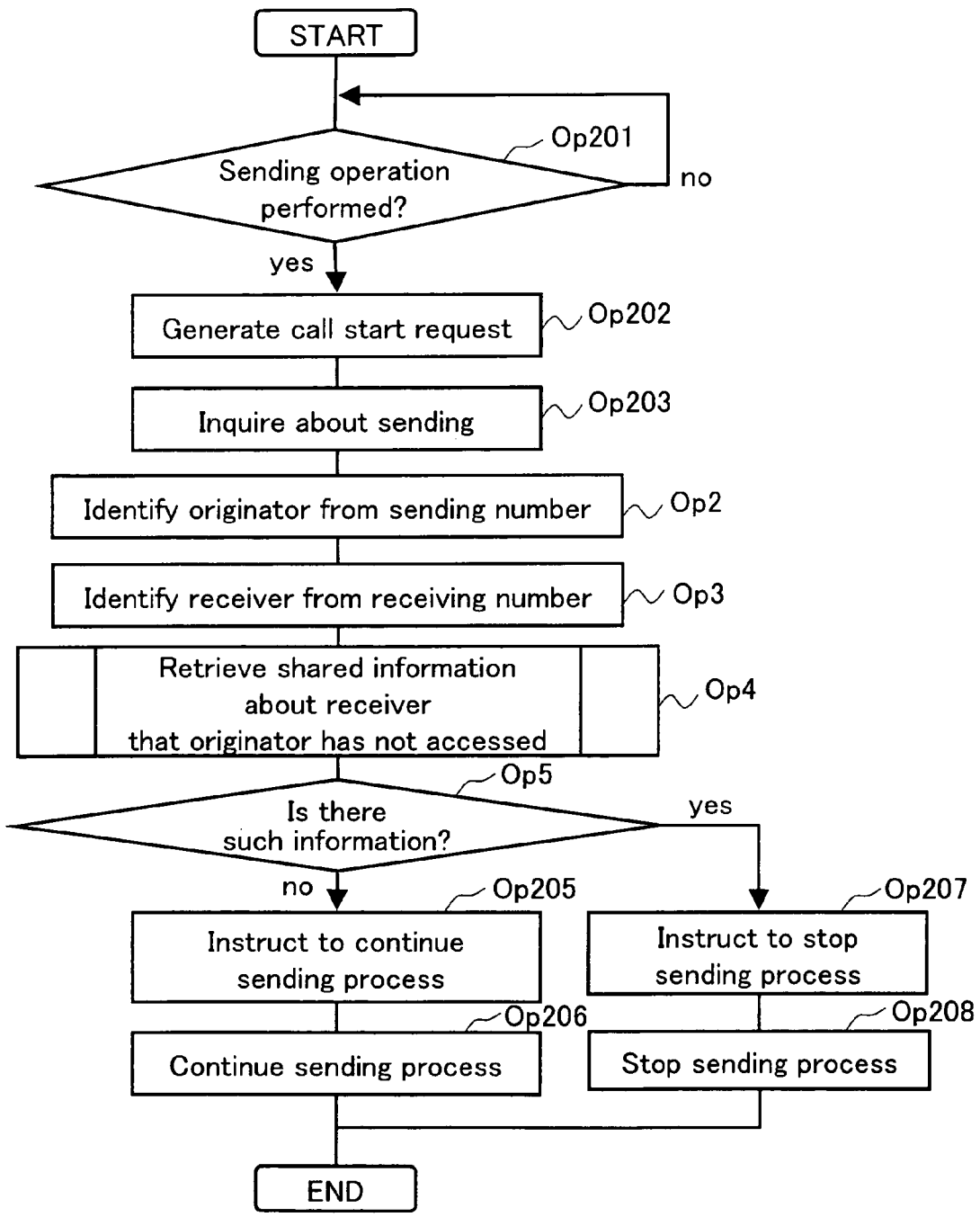
FIG. 15 is a flowchart showing exemplary operations of the communication support system and a user terminal of Embodiment 5.

The following describes a specific example of the operation by the communication support system 101 and the user terminal 12c. FIG. 15 is a flowchart showing exemplary operations by the communication support system 101 and the user terminal 12c when the user terminal 12c accepts a sending operation from the user.

In FIG. 15, the sending portion 17 of the user terminal 12c judges whether a user has performed a sending operation or not (Op201). When judging that the sending operation has been performed, the sending portion 17 generates a call start request in accordance with the sending operation (Op202). The sending portion 17 notifies the sending confirmation portion 18 of the generated call start request. Herein, in the case where no sending operation has been performed, the sending portion 17 becomes a stand-by state.

The sending operation is such that a user inputs a telephone number of a party to whom the user wishes to talk, for example. The call start request generated by the sending portion 17 contains a telephone number of the user terminal 12c (telephone number of an originator's terminal: sending number) and a telephone number input by the sending operation (telephone number of a receiver's terminal: receiving number), for example.

Figure 16:
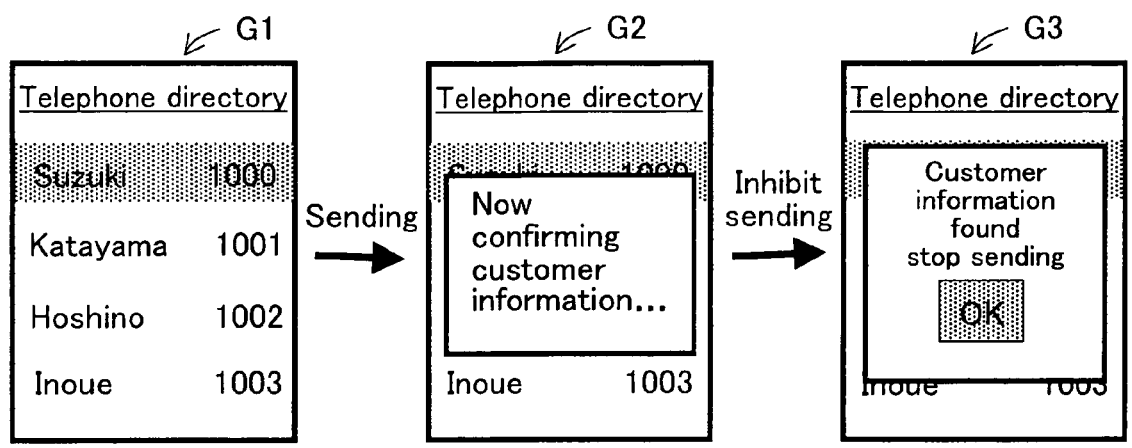
FIG. 16 shows a specific example of the transition of a screen displayed on a display provided in a user terminal.

FIG. 16 shows a specific example of the transition of a screen displayed on a display provided in the user terminal 12c. The screen G1 of FIG. 16 is an example displayed when a user performs a sending operation. On the screen G1, names of persons the user talk to and telephone numbers thereof are displayed. By selecting a name of the person the user wishes to talk to and a telephone number thereof, the user can perform a sending operation. For instance, when the user selects "Suzuki 1000" on the screen G1, the user can instruct the sending to the user named "Suzuki" whose user terminal has a number of "1000". In this case, the call start request generated by the sending portion 17 contains the telephone number of the user terminal 12c and the telephone number of "Suzuki", i.e., "1000".

When receiving the notice about the call start request from the sending portion 17, the sending confirmation portion 18 inquires from the communication support system 101 as to whether or not to send the call start request (Op203). To this end, the sending confirmation portion 18 sends the call start request to the communication support system 101 via the packet communication network 23. Further, the sending confirmation portion 18 displays a message indicating the inquiry being made on the display of the user terminal 12c as shown in the screen G2 of FIG. 16, for example.

When the reception portion 2b of the communication support system 101 receives the call start request from the user terminal 12c, the reception portion 2b notifies the user identification portion 3 of it. The following process at Op2 to Op5 is the same as that at Op2 to Op5 of FIG. 4.

In the case of no at Op5, i.e., in the case where the retrieval portion 4 judges that there is no shared information concerning the receiver that the originator has not accessed, the control portion 5b generates control data instructing to continue the sending and sends it to the sending confirmation portion 18 of the user terminal 12c (Op205). When receiving the control data, the sending confirmation portion 18 notifies the sending portion 17 of the control data. When being notified of the control data, the sending portion 17 continues the sending process (Op206). That is, the sending portion 17 sends the call start request generated at Op202 to the communication control server 6 via a telephone network 13.

On the other hand, in the case of yes at Op5, the control portion 5b generates control data instructing to stop the sending, and sends it to the sending confirmation portion 18 of the user terminal 12c (Op207). When receiving the control data, the sending confirmation portion 18 notifies the sending portion 17 of the control data. When being notified of the control data, the sending portion 17 stops the sending process (Op208). That is, the sending portion 17 cancels the call start request generated at Op202. At this time, the sending portion 17 may display a message indicating that the sending process was stopped on the display of the user terminal 12c as shown in the screen G3 of FIG. 16, for example.

As stated above, according to the process of FIG. 15, the sending from the user terminal 12c can be controlled without through the communication control server 6. Note here that the communication between the communication support system 101 and the user terminal 12c is not limited to the case through the packet communication network 23. The control portion 5b may generate control data instructing the forwarding to a user as a forwarding destination, in addition to the control data instructing to stop or continue the sending, for example.

In this way, the above-stated Embodiments 1 to 5 exemplify the case where when a customer of a certain business and a sales representative in charge make a call via the telephone network 13, the communication control system 1 controls such a call. However, the call that the communication support system 1 can control is not limited to a call between a customer and a sales representative in charge.

Specific examples of the telephone network 13 in the above-stated embodiments include a public switched network, an IP telephone network, a mobile telephone network or a combination thereof, for example. In the case where the telephone network 13 is a public switched network, an exchange can be used as the call control server 6, for example. In the case where the telephone network 13 is an IP telephone network, a SIP server can be used as the call control server 6, for example.

Note here that in the above-stated embodiments, the user identification portion 3 identifies the originator and the receiver by the names of the users. However, the data for specifying the originator and the receiver is not limited to user's names. For instance, the originator and the receiver may be specified by users' telephone numbers, mail addresses, IDs and the like.

The present invention is applicable to a communication support system that can control communication between users' terminals used by a plurality of users, respectively, and support the communication so that an originator and a receiver can communicate smoothly.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A communication support system connected with a network enabling communication among a plurality of user terminals used by a plurality of users, respectively,
   wherein the communication support system is capable of accessing a user information recording portion in which shared information and access information are recorded, the shared information concerning one or more users included in the plurality of users, and the access information indicating a user who has accessed the shared information,
   wherein the communication support system comprises:
   a user identification portion that acquires a communication start request from any one of the plurality of user terminals and identifies an originator of a communication that is required to start and a receiver of the communication;
   a retrieval portion that refers to the shared information and the access information recorded in the user information recording portion and makes a judgment as to whether any piece of the shared information concerning the receiver that the originator has not accessed is present or not;
   a control portion that, based on a result of the judgment by the retrieval portion, makes a judgment as to whether the communication between a user terminal of the originator and a user terminal of the receiver is to be started or not and outputs a result of the judgment; and
   a process judgment portion that acquires a communication start request from any one of the plurality of user terminals before the user identification portion acquires the same, makes a judgment as to whether the communication start request contains specific data, and determines based on the judgment as to whether the user identification portion is to be notified of the communication start request.

2. The communication support system according to claim 1, wherein in the case where the retrieval portion judges that shared information concerning the receiver that the originator has not accessed is present in the user information recording portion, the control portion judges that the communication between the user terminal of the originator and the user terminal of the receiver is not to be started.

3. The communication support system according to claim 1, wherein in the case where the retrieval portion judges that shared information concerning the receiver that the originator has not accessed is present in the user information recording portion, the control portion makes a judgment that the communication between the user terminal of the originator and the user terminal of the receiver is not to be started, and outputs, as a result of the judgment, data indicating a terminal as a forwarding destination that is recorded beforehand.

4. The communication support system according to claim 3, further comprising an update portion,
   wherein in the case where the control portion outputs, as a result of the judgment, data indicating a terminal as a forwarding destination that is recorded beforehand, the update portion updates the access information so as to show that the originator is a user who has accessed the shared information.

5. The communication support system according to claim 1, further comprising an information providing portion,
   wherein in the case where the retrieval portion judges that shared information concerning the receiver that the originator has not accessed is present in the user information recording portion, the information providing portion allows the shared information that the originator has not accessed to be sent to the user terminal of the originator.

6. The communication support system according to claim 5, further comprising an update portion,
   wherein in the case where the information providing portion makes the shared information that the originator has not accessed sent to the user terminal of the originator, the update portion updates the access information so as to show that the originator is a user who has accessed the shared information.

7. The communication support system according to claim 1, wherein the user identification portion further acquires a communication completion notice indicating that communication by any one of the plurality of user terminals is completed, and identifies an originator of the completed communication and a receiver of the completed communication, wherein the communication support system further comprises a registration portion that registers information containing a history of the completed communication as shared information about at least one of the originator and the receiver in the completed communication.

8. The communication support system according to claim 1 connected with a communication control server that controls a communication among the plurality of user terminals used by the plurality of users, respectively, the communication support system further comprising:

a reception portion that receives from the communication control server a communication start request that is sent from any one of the plurality of user terminals to the communication control server, and notifies the user identification portion of the communication start request, wherein the control portion outputs the result of the judgment to the communication control server.

9. A communication support system connected with a network enabling communication among a plurality of user terminals used by a plurality of users, respectively, wherein the communication support system is capable of accessing a user information recording portion in which shared information and access information are recorded, the shared information concerning one or more users included in the plurality of users, and the access information indicating a user who has accessed the shared information, wherein the communication support system comprises:

a user identification portion that acquires a communication start request from any one of the plurality of user terminals and identifies an originator of a communication that is required to start and a receiver of the communication;

a retrieval portion that refers to the shared information and the access information recorded in the user information recording portion and makes a judgment as to whether any piece of the shared information concerning the receiver that the originator has not accessed is present or not; and a control portion that, based on a result of the judgment by the retrieval portion, makes a judgment as to whether the communication between a user terminal of the originator and a user terminal of the receiver is to be started or not and outputs a result of the judgment, wherein in the case where it is judged that shared information concerning the receiver that the originator has not accessed is not present in the user information recording portion, the control portion further judges as to whether the communication start request contains specific data, and in the case where the communication start request contains specific data, the control portion judges that the communication between the user terminal of the originator and the user terminal of the receiver is not to be started.

10. A communication support method that uses a computer connected with a network enabling communication among a plurality of user terminals used by a plurality of users, respectively, the communication support method comprising the steps of:

an identification step in which a user identification portion of the computer acquires a communication start request from any one of the plurality of user terminals and identifies an originator of a communication that is required to start and a receiver of the communication;

a retrieval step in which a retrieval portion of the computer accesses a user information recording portion in which shared information and access information are recorded, the shared information concerning one or more users included in the plurality of users, and the access information indicating a user who has accessed the shared information, and the retrieval portion makes a judgment as to whether shared information concerning the receiver that the originator has not accessed is present or not;

a step in which a control portion of the computer makes a judgment, based on a result of the judgment by the retrieval step, as to whether the communication between a user terminal of the originator and a user terminal of the receiver is to be started or not and outputs a result of the judgment; and a step in which a process judgment portion of the computer acquires a communication start request from any one of the plurality of user terminals before the user identification portion acquires the same, makes a judgment as to whether the communication start request contains specific data, and determines based on the judgment as to whether the user identification portion is to be notified of the communication start request.

11. A non-transitory computer-readable recording media storing a communication support program that makes a computer connected with a network enabling communication among a plurality of user terminals used by a plurality of users, respectively, execute the following processes of:

a process of acquiring a communication start request from any one of the plurality of user terminals and identifying an originator of a communication that is required to start and a receiver of the communication;

a retrieval process of accessing a user information recording portion in which shared information and access information are recorded, the shared information concerning one or more users included in the plurality of users, and the access information indicating a user who has accessed the shared information, and making a judgment as to whether shared information concerning the receiver that the originator has not accessed is present or not;

a process of making a judgment, based on a result of the judgment by the retrieval process, as to whether the communication between a user terminal of the originator and a user terminal of the receiver is to be started or not and outputting a result of the judgment; and a process of making a judgment that acquires a communication start request from any one of the plurality of user terminals before the process of acquiring acquires the same, makes a judgment as to whether the communication start request contains specific data, and determines based on the judgment as to whether an user identification portion is to be notified of the communication start request.

* * * * *